United States Patent [19]

DeLapp et al.

[11] 4,093,579

[45] June 6, 1978

[54] LOW PRESSURE MELAMINE RESINS CONTAINING AN ETHYLENE GLYCOL AND AN ELASTOMER

[75] Inventors: Darwin Fiske DeLapp, New Canaan; James Christopher Goebel, Stamford, both of Conn.; Kenneth Dana Bunkowski, Cincinnati, Ohio

[73] Assignee: Formica Corporation, Cincinnati, Ohio

[21] Appl. No.: 767,722

[22] Filed: Feb. 11, 1977

[51] Int. Cl.$^2$ .............................................. C08L 61/28
[52] U.S. Cl. .................................. 260/29.4 R; 260/21; 260/29.4 UA; 260/849; 260/852; 260/853; 260/856; 428/503; 428/526
[58] Field of Search .............. 260/29.4, 29.4 UA, 849, 260/851, 852, 853, 856

[56] References Cited

U.S. PATENT DOCUMENTS

| | | | |
|---|---|---|---|
| 3,310,416 | 3/1967 | Schibler | 106/285 |
| 3,479,310 | 11/1969 | Dieterich et al. | 260/29.4 R |
| 3,501,429 | 3/1970 | Bonzagni | 260/67.6 R |
| 3,715,172 | 2/1973 | Dembowski et al. | 260/3 |

Primary Examiner—Theodore E. Pertilla
Attorney, Agent, or Firm—Frank M. Van Riet

[57] ABSTRACT

A composition of matter comprising (1) a blend of an aqueous melamine/formaldehyde resin solution and from about 2 to about 20.0% of an ethylene glycol or (2) an aqueous solution of the resinous reaction product of melamine, formaldehyde and from about 2.0 to about 20.0% of an ethylene glycol, is disclosed.

5 Claims, No Drawings

LOW PRESSURE MELAMINE RESINS CONTAINING AN ETHYLENE GLYCOL AND AN ELASTOMER

BACKGROUND OF THE INVENTION

The production of decorative surfaced panels designed for such applications as furniture and vertical surfaces where exceptionally high abrasion resistance is not required has increased enormously over the past decade. These panels comprise a single sheet of melamine/formaldehyde resin impregnated decorative paper which is bonded under heat and pressure to a substrate, usually particleboard, of about one-quarter to about one inch in thickness. These products, because they are produced at low pressures, i.e., about 300 psi, and at very short cure cycles, i.e., 2-3 minutes, are relatively inexpensive and have a good appearance and stain resistance.

Abrasion resistance thereof is, however, often poor and attempts have been made to improve the property by providing a layer of clear, unfilled melamine/formaldehyde resin on top of the decorative sheet. While these panels have proven very successful in that the abrasion resistance is somewhat elevated, they deteriorate when subjected to humidity conditions encountered in normal use.

This deterioration manifests itself as surface cracks in the panel after it is subjected to low humidity. The cracks are believed to be a result of the dimensional instability of the melamine/formaldehyde resin. These resins undergo dimensional changes owing (1) to loss of water during curing, (2) to cooling after release from the panel press and (3) to loss or gain of water during subsequent exposure to the environment. The dimensional changes are often enough to strain the resin to failure, thus forming cracks. The decorative cellulosic sheet aids in the resistance of the panel to cracking, but its effectiveness is limited by the need for a resin-rich surface to impart abrasion resistance.

Known additives which generally have been added to melamine/formaldehyde resins (such as sucrose, dipentaerythritol sebacate, etc.) so as to react with the resin and reduce the tightness of cross-linking usually associated with brittleness do not prevent cracking to a satisfactory degree.

Attempts to increase the abrasion resistance of these so-called "low pressure melamine panels" by increasing the surface layer of resin on the panel have proven unsuccessful because the thicker resin layers tend to result in more serious crack formations. Other attempts to solve the crack and abrasion problem have resulted in satisfactory solutions from the standpoint of panel efficiency but have so increased the cost of production that sales of the panels have decreased.

Therefore, if a panel could be produced at low cost having intermediate abrasion and crack resistant properties at low humidity, a long-felt need could be satisfied.

SUMMARY OF THE INVENTION

We have now found that the propensity of the melamine/formaldehyde resinous materials for producing a low humidity sensitive low pressure panel of reduced abrasion resistance can be materially reduced, if not obviated, by incorporating an ethylene glycol into the resinous composition. Not only does the use of the ethylene glycol function adequately alone, but its use with other additives results in equally effective low pressure panels. These results are unexpected because ethylene glycols have not previously been used in this type of resin formulation.

DESCRIPTION OF THE INVENTION INCLUDING PREFERRED EMBODIMENTS

As mentioned briefly above, we have now discovered that melamine/formaldehyde resinous materials, in aqueous solution, provide low pressure decorative panels having good resistance to low humidity cracking and crazing and intermediate abrasion resistance at an economical level when having an ethylene glycol in conjuction therewith. The ethylene glycol can be used as a reactant with the melamine and formaldehyde in producing the resinous material or the melamine and formaldehyde can first be reacted to produce the resinous material and the ethylene glycol can then be added thereto.

The melamine/formaldehyde resin materials useful herein are well known to those skilled in the art. They are generally prepared by adding water, melamine crystal, formaldehyde, usually used as a 37% solution in water, and other additives in minor amounts, to water in a mole ratio of melamine to formaldehyde of from about 1 : 1.6 to about 1 : 2.5 and allowing the reaction to proceed at about 75-90° C. for 5-12 hours. Sufficient material is added to produce a resin solids content of from about 4 to about 75%, preferably from about 50 to about 65%, in the resultant aqueous solution. After the resinous melamine/formaldehyde material is so prepared, the ethylene glycol can be added to the aqueous solution thereof in amounts ranging from about 2.0 to about 20.0%, by weight, based on the resinous solids. Alternatively, when the ethylene glycol is added with the charge materials to the reaction vessel, i.e., the melamine and formaldehyde, it can be added in the same quantity, by weight, as above, based on the total weight of the melamine and formaldehyde charge materials.

To the melamine/formaldehyde resin-ethylene glycol blend or the melamine, formaldehyde and polyethylene glycol reaction produce can also be added an elastomer, as a mixture therewith, in such a quantity so as to result in a solids content of the elastomer of from about 2.5 to about 30.0%, preferably from about 5.0 to about 25.0%, by weight, based on the total weight of the resin solids.

The elastomer is preferably added to the resin solution as small particles and usually in latex form. The particle size in most instances should not exceed about 4,000 A; however, it is possible, in some cases, to utilize elastomers having a particle size, on the average, of up to about 20,000 A. Where it is required that the compositions produce a transparent system, e.g., in the production of decorative panels of a specific color or having a specific decorative pattern or design on the decorative layer, haze production can be decreased if the elastomeric additive has a particle size of less than about 1,000 A. Alternatively, haziness can be reduced, i.e., transparency can be enhanced by matching the refractive index of the elastomer to that of the resin. The combination of a particle size less than about 1,000 A and a matching refractive index will, of course, further enhance the usefulness of the elastomer.

Examples of elastomeric materials which may be used include the ethylene/vinyl chloride polymers having available reactive amide groups. These copolymers are well known in the art and contain from about 20 to about 30% ethylene, from about 65 to about 80% vinyl chloride and from about 0.5 to about 7%, preferably from about 1.0 to about 5.0% amide groups, said percentages totaling 100% and being, by weight, based on the total weight of the elastomer. The amide functionality can be imparted to the ethylene/vinyl chloride copolymer in any manner known to those skilled in the art such as by copolymerization thereof with amide containing vinyl monomer, e.g., acrylamide, methacrylamide and the like, see U.S. Pat. No. 3,428,582 incorporated herein by reference.

Polyurethane elastomers are also useful herein and are governed only by their ability to either dissolve in water or to form a latex. That is to say, if the polyurethane elastomer is per se water-soluble, it can be added as such to the aqueous resin solution and produce a composition which may be used to prepare a useful laminate. Alternatively, if the polyurethane elastomer is capable of being formed into a latex, the latex can be added to the aqueous resin solution and the elastomer will, of course, remain dispersed therein. The resultant dispersion can then be used to impregnate a decorative sheet and form a decorative panel.

The polyurethane resin can therefore be produced by reacting such polyols as those having a molecular weight of from about 400 to about 5,000, preferably from about 600 to about 3,000, with an isocyanate. Useful polyols include those produced from diols such as the polyoxyalkylene adducts of diols and alkylene oxides such as ethylene oxide, propylene oxide, butylene oxide, mixtures thereof and the like. Useful diols include ethylene glycol, 1,2-propylene glycol, 1,3-propylene glycol, 1,2-butanediol, 1,4-butanediol, 1,6-hexanediol, hydroquinone, bisphenol A and the like.

Typical polyoxyalkylene diols include polyethyleneether glycol, polypropyleneether glycol, polytetramethyleneether glycol and the like.

Polyoxyalkylene arylene diols which also have molecular weights ranging from about 400 to about 5,000 but which differ from the above-described polyoxyalkylene diols in having arylene radicals, such as phenylene, naphthylene and anthrylene radicals, either unsubstituted or substituted, e.g., with alkyl or aryl groups, and the like, in place of some of the alkylene radicals of said polyoxyalkylene diols may also be employed. Polyoxyalkylenearylene glycols of the type ordinarily used for this purpose will usually contain at least one alkylene ether radical having a molecular weight of about 200 for each arylene radical present.

Essentially linear polyesters constitute another class of reactive organic diols which may be employed in preparing urethane prepolymers used in the present invention. While the preparation of polyesters suitable for ths purpose has been described in great detail in the prior art and forms no part of the present invention per se, it may be mentioned here by way of illustration that polyesters of this type may be prepared by the condensation of a dihydric alcohol, generally a saturated aliphatic diol such as ethylene glycol, propanediol-1,2, propanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic succinic, glutaric, adipic, pimelic, suberic, azelaic, terephthalic, sebacic, malic, phthalic, cyclohexanedicarboxylic and endomethylenetetrahydrophthalic acid, and the like, and their isomers, homologs, and other substituted derivatives, e.g., chloro derivatives. The linear polyesters used in preparing the urethane prepolymers also have molecular weights ranging from about 400 to about 5,000. In addition, they generally have relatively low acid numbers, e.g., acid numbers not appreciably in excess of about 60 and preferably as low as can be practicably obtained, e.g., 2 or less. Correspondingly, they have relatively high hydroxyl numbers, e.g., from about 20 to about 300. When preparing these polyesters, an excess of diol over dicarboxylic acid is generally used.

As can be readily appreciated, mixtures of the various reactive organic diols described hereinabove may also be employed in preparing the urethane prepolymers of the present invention.

The organic diisocyanates which can be employed to produce the urethane used in the present invention include, for example, the aliphatic, cycloaliphatic and aromatic diisocyanates including m-xylene diisocyanate, methylenediisocyanate, tetramethylene diisocyanate, hexamethylene diisocyanate, 4,4'-methylenebis (cyclohexyl isocyanate), 4-chloro-m-phenylene diisocyanate, isophorone diisocyanate, o,p, or m-phenylene diisocyanate, trimethylhexamethylene diisocyanate, 4-t-butyl-m-phenylene diisocyanate, 4,4'-methylene bis(phenyl isocyanate), tolylene diisocyanate, 1,5-naphthalene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, 3,3'-dimethoxy-4,4'-biphenylene diisocyanate, mixtures thereof and the like.

The polyol may be reacted with the diisocyanate in the presence of a suitable catalyst such as an organotin compound, e.g., dibutyltin dilaurate, dibutyltin octoate and the like; a tertiary amine, e.g., triethylene diamine; an organolead compound, e.g., lead octoate and the like, at concentrations of from about 0.001 to about 0.1%, by weight, based on the total weight of the polyol and diisocyanate. The reaction is allowed to proceed at a temperature of from about 60° to about 180° C. until the isocyanate terminated urethane prepolymer forms, i.e., from about 4 to about 24 hours.

In order for the polyurethane elastomer to be useful herein, it must contain carboxyl groups. These carboxyl groups, present in the elastomer in a concentration of about 3.0 to 10.0%, by weight, based on the total weight of the elastomer, can be incorporated into the elastomer by any known procedure such as by replacing an equivalent amount of the above-mentioned polyol with a polyol containing at least one carboxyl group. Suitable compounds conforming to this description are 2,2-dimethylol propionic acid, tartaric acid, glyceric acid, bis(hydroxymethyl)benzoic acid, bis(hydroxymethyl)cyclohexane carboxylic acid and the like. U.S. Pat. No. 3,479,310, also incorporated herein by reference, teaches the production of such carboxyl containing polyurethanes.

A third series of elastomers useful herein comprises the butadiene/acrylonitrile copolymers containing available carboxyl groups. These elastomers are well known in the art as represented by British Application No. 16737/72 (Provisional specification) filed Apr. 11, 1972 and generally comprise from about 50–95% of butadiene and, correspondingly, from about 5–50% of acrylonitrile. Carboxylation of the copolymer in amounts ranging from about 1–10% can be achieved by replacing a portion of either of the comonomers with a carboxyl group containing monomer or carboxylating the copolymer, as is known in the art.

The elastomer may be blended with the resinous solution per se or after having emulsified it with a suitable amine such as triethanol amine, N-methyl morpholine, tetramethyl ammonium hydroxide, triethylamine, tetrabutylammonium hydroxide, and the like, with stirring for from about 3–15 minutes. Catalyst, such as ammonium sulfate, thiourea, hydrochloric acid, sulfuric acid, formic acid, acetic acid, oxalic acid, sodium hydroxide, potassium hydroxide, sodium carbonate and the like, can be added at this time to regulate subsequent cure rate of the resin when the decorative sheet containing it is heat and pressure consolidated into the decorative panel. The use of such a catalyst is, however, not preferred if an alkylene polyamine is added to the composition in a manner discussed more fully hereinbelow.

The ethylene glycols employed herein have the general formula

HO$-[CH_2CH_2O]_n$H wherein $n$ is a whole, positive integer of 1–45 inclusive, i.e., sufficient to produce a material having a molecular weight of from about 62 to about 2100. Useful ethylene glycols include ethylene glycol, diethylene glycol and those commercially available polyethylene glycols having molecular weights of 600, 2000 etc. The ethylene glycols are incorporated into the compositions in amounts ranging from about 2.0 to about 20.0%, by weight, based on the total weight of melamine and formaldehyde monomers.

The alkylene polyamines useful herein have the general formula

H$_2$N$-[$CH$_2$CH$_2$NH$-]_n$CH$_2$CH$_2$NH$_2$ wherein $n$ is a whole, positive integer of 0–3, inclusive. Examples of useful polyamines includes ethylene diamine, diethylenetriamine, triethylene tetramine and tetraethylene pentamine. The polyamines are incorporated into the formulations in amounts ranging from about 0.25 to about 1.25%, by weight, based on the total solids, i.e., the melamine/formaldehyde resin and the elastomer of the composition.

The aqueous resin solutions can be used as such or the resin itself and/or the solution, often times called a "syrup," may be further modified by the addition of known additives thereto.

The blending of the prepared elastomer with the resin solution containing the additive or coreacted novel compositions of our invention may be prepared. It is also possible, however, to form the elastomer in situ in the resin solution by incorporating therein a solution of the elastomer components and then forming the elastomer during the resin precuring operation and/or the decorative panel production.

The resultant composition is then used to impregnate a cellulosic decorative sheet in a manner known in the art. The composition, once impregnated, is then precured by heating at 80°–125° C, for 3–50 minutes, shorter times requiring higher temperatures and vice versa. The impregnated paper should contain at least about 40% resin, by weight, based on the total weight of the resin-impregnated sheet.

A decorative panel is then prepared from the β-staged decorative sheet by forming a stack in superimposed relationship of a steel plate, a ¼–1 inch particleboard sheet, the β-staged decorative sheet, a release sheet and a second steel plate. The stack is placed in a press, heated to at least about a 130° C. platen temperature and at least 200 psi pressure is applied for about 15 seconds to about 12 minutes. The resultant panel is recovered by merely opening the press and removing the release sheet.

The following examples are set forth for purposes of illustration only and are not to be construed as limitations on the present invention except as set forth in the appended claims. All parts and percentages are by weight unless otherwise specified.

The Taber abrasion Resistance Test mentioned below is specifically detailed in N.E.M.A. Standards Publication "Laminated Thermosetting Decorative Sheets," Standard #LD1-2,01 "Method of Test of Resistance of Surface of Wear."

EXAMPLE A

PREPARATION OF A POLYURETHANE EMULSION

To a suitable reaction vessel equipped with stirrer, thermometer, N$_2$ gas inlet and vacuum adapter are added 44.2 parts of polytetramethylene glycol having a molecular weight of 2,000 and 11.9 parts of 2,2-bis(hydroxymethyl)propionic acid. The vessel is heated to 100° C. and a 1–2 mm Hg pressure for 2 hours to dry the glycol and acid. A blanket of nitrogen gas is then maintained over the vessel contents and the vessel is cooled to 40° C. 43.9 Parts of toluene diisocyanate are then added and the exotherm is controlled at 80° C. for 8 hours. The vessel is then cooled to 60° C. and the resultant polyurethane polymer is transferred to a second vessel and sealed under nitrogen.

To a third vessel are added 7.0 parts of triethanol amine, as an emulsifier, in 90 parts of water. The vessel is cooled to 4° C. The cooled solution is transferred to a fourth vessel which has been cooled to 0° C. and is equipped with vigorous agitation means. The solution is vigorously agitated and 30.0 parts of the above-prepared polyurethane polymer is heated to 100° C. and added to the vortex of the agitating solution in a continuous stream. When addition is complete, 10.0 parts of chipped ice are added and stirring is continued 1 minute. Another 10.0 parts of chipped ice are added and the media is again agitated for 1 minute. The vessel contents are then transferred to a suitable container, cooled to 10° C. and stirred for 5 hours while the temperature slowly rises to ambient. A clear, blue opalescent emulsion of 25% solids is recovered. Small amounts of coagulam which may be present therein are removed by filtering the emulsion through No. 1 Whatman paper. The average particle size of the elastomer is less than 1,000 Angstroms.

EXAMPLE 1

45.2 parts of a 37% formalin solution, 38.5 parts of crystalline melamine, 12.2 parts of water and 4.1 parts of diethylene glycol are charged to a suitable reaction vessel and heated to about 90° C. for about 2 hours. 0.05 part of ammonium sulfate catalyst is then added.

A large section of woodgrained print paper is impregnated with the resultant catalyst containing resin solution. The impregnated sheet is precured in an air circulating oven. The precured paper sheet is then placed atop a particleboard section of the same size with the decorative side up and a release sheet is placed on top of the decorative side thereof. The assembly is placed between 2 steel press plates, slid into a hydraulic press heated to a platen temperature of about 140° C. and pressed at about 250-350 psi for about 1-3 minutes. The resultant panel is removed from the press and tested.

At abrasion levels of 85-105 Taber cycles, no cracking of the panel surface is observed at low himidity conditions.

EXAMPLE 2

To a suitable reaction vessel are charged 46.0 parts of a 37% formalin solution, 39.4 parts of melamine crystal, 12.3 parts of water and 2.4 parts of polyethylene glycol having a molecular weight of 380-420. The condensation is run for about 1 hour at 90° C. When formed into a panel as in Example 1 except that the press temperature is about 160° C., the resultant panel has a good appearance, shows no cracks after 30 days, has an abrasion of 100 Taber cycles and an impact of 18 inches. The surface withstands 500 seconds of contact with a burning cigarette and shows no effect when subject to the Tea Pot Test.

EXAMPLE 3

The procedure of Example 1 is again followed except that 1.2 parts of the diethylene glycol are used and 1.03 parts of the polyurethane elastomer of Example A, above, are added. Ammonium sulfate is again used as the curing catalyst. The resultant panel has 0 cracks after 35 days at 0% R.H. and a Taber Cycles to Failure of 230.

EXAMPLE 4

When Example 3 is again followed except that 1% of tetraethylene pentamine is also added, 0 cracks form after 35 days at 0% R.H. and the Taber Cycles to Failure is 300.

EXAMPLE 5

The procedure of Example 2 is again followed except that to the resultant solution are added 4.1 parts of the polyurethane elastomer of Example A, above. Again, excellent abrasion and low humidity crack resistance are observed.

EXAMPLE 6

Again following the procedure of Example 5 except that 10% of a commercially available ethylene/vinyl chloride (18/77) copolymer containing 5% amide functionality is used instead of the polyurethane, a smooth, clear film results on the decorative panel. The average particle size of the copolymer is about 775 A. Precuring followed by laminating as described in Example 2 results in panels having good abrasion resistance. No cracks are observed after 20 days at 0% R.H.

EXAMPLE 7

The procedure of Example 1 is again followed except that 10% of the commercially available ethylene/vinyl chloride copolymer elastomer of Example 6 is added thereto. Similar results are achieved.

EXAMPLE 8

The procedure of Example 5 is again followed except that the elastomer is replaced by 21% of a commercially available butadiene/acrylonitrile (80/20) copolymer containing 3.5% carboxyl groups. A sharp, bright decorative panel is recovered which exhibits good crack resistance at low humidity and possesses no cracks after 20 days at 0% R.H.

EXAMPLES 9-11

When the tetraethylene pentamine of Example 4 is replaced by an equivalent amount of (9) ethylene diamine, (10) diethylene triamine and (11) triethylene tetramine, substantially identical results are achieved.

EXAMPLE 12

The procedure of Example 3 is followed employing the elastomer of Example 8 in place of the polyurethane. Good abrasion resistance and low humidity craze resistance are recorded.

EXAMPLE 13

To 40 parts of 1 : 1.6 melamine/formaldehyde resin syrup at 58% solids are added 4.4 parts of ethylene glycol. The blend is stirred to achieve a good admixture and ammonium sulfate is added as a catalyst. A laminate is then made from the resultant syrup as in Example 1. Substantially identical results are achieved.

EXAMPLE 14

When the procedure of Example 13 is again followed except that the ethylene glycol is replaced by 2.9 parts of a commercially available polyethylene glycol of a molecular weight of about 2000, good results are observed.

EXAMPLE 15

The ethylene glycol of Example 13 is replaced by an equivalent amount of diethylene glycol with substantially the same effect.

We claim:
1. A composition of matter comprising
(1) a blend of an aqueous melamine/formaldehyde resin solution and from about 2 to about 20%, by weight, based on the solids weight of said resin, of an ethylene glycol having a molecular weight of from about 62 to about 2100, or
(2) an aqueous solution of the resinuous reaction product of (I) melamine, (II) formaldehyde and (III) from about 2 to about 20.0%, by weight, based on the total weight of melamine and formaldehyde, of an ethylene glycol having a molecular weight of from about 62 to about 2,000, wherein said (1) or (2) contains, in admixture therewith, (3) from about 2.5 to about 30.0%, by weight, based on the weight of resin solids in (1) or (2), of an elastomer comprising
(a) an ethylene/vinyl chloride containing from about 20 to about 30% ethylene, from about 65 to about 80% vinyl chloride and from about 0.5 to about 7.0%, by weight, said percentages being based on the total weight of (a), of amide groups,
(b) a polyurethane resin containing from about 3.0 to about 10.0%, by weight, based on the total weight of (b), of carboxyl groups, or
(c) a butadine/acrylonitrile copolymer containing from about 50 to about 95% butadiene, from about 5 to 50% acrylonitrile and from about 1 to about 10%, by weight, said percentages being based on the total weight of (c), of carboxyl groups,
said elastomer having a particle size of up to about 20,000 Angstroms.

2. The composition according to claim 1 wherein said ethylene glycol is a polyethylene glycol having a molecular weight of about 600.

3. The composition according to claim 1 wherein said ethylene glycol is diethylene glycol.

4. The composition according to claim 1 wherein said ethylene glycol is ethylene glycol.

5. The composition according to claim 1 wherein said composition contains
(4) an alkylene polyamine.

* * * * *